United States Patent [19]
Neufeld

[11] Patent Number: 5,582,013
[45] Date of Patent: Dec. 10, 1996

[54] ELECTROMECHANICAL CRYOCOOLER

[75] Inventor: Kenneth W. Neufeld, Manteca, Calif.

[73] Assignee: Regents of the University of California, Oakland, Calif.

[21] Appl. No.: 438,219

[22] Filed: May 9, 1995

[51] Int. Cl.$^6$ ............................................. F25B 9/00
[52] U.S. Cl. ................................................. 62/6; 60/520
[58] Field of Search ................................... 62/6; 60/520

[56] References Cited

U.S. PATENT DOCUMENTS

| | | | |
|---|---|---|---|
| 5,018,357 | 5/1991 | Livingstone et al. | 62/6 |
| 5,032,772 | 7/1991 | Gully et al. | 62/6 |
| 5,392,607 | 2/1995 | Wu | 62/6 |
| 5,412,951 | 5/1995 | Wu | 62/6 |

*Primary Examiner*—Ronald C. Capossela
*Attorney, Agent, or Firm*—Henry P. Sartorio

[57] ABSTRACT

An electromechanical cryocooler is disclosed for substantially reducing vibrations caused by the cooler. The direction of the force of the vibrations is measured and a counterforce sufficient to substantially reduce this vibration is calculated and generated. The counterforce is 180° out of phase with the direction of the force of the vibrations.

16 Claims, 2 Drawing Sheets

ELECTROMECHANICAL CRYOCOOLER

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

This invention relates to an electromechanical cryocooler that reduces or cancels out vibrations generated by the cooler.

2. Description of Related Art

Cryogenic refrigerators, or cryocoolers, are used to cool highly sensitive instruments, such as radiation detectors, spectrometers, and chromatographs. The detectors typically must be kept at extremely low, constant temperatures to reduce thermal noise. The use of cryocoolers has continued to increase with the demand for portable, rugged, and reliable instruments for field measurements.

Cryocoolers use a piston that is cyclically driven to compress and expand a working fluid. Although thermodynamically efficient, these cryocoolers have the adverse effect of vibrating. The measurements of the detector may be corrupted by motions of the detector, and therefore these vibrations must be reduced for the detector to work accurately. Conventional designs for mechanically cooled instruments have no mechanisms for substantially eliminating vibrations that can interfere with the optimum operation of the instruments. Typical methods for reducing adverse effects due to mechanical forces include vibration damping by adding to the cooler mass or by adding vibration-decoupling supports to the cooled object.

These conventional techniques are undesirable, especially in applications where reduced size, low weight, minimum power use, and robust field performance are critical. Thus, there is a need for a cryocooler that significantly reduces adverse vibration effects in mechanically-cooled systems.

SUMMARY OF THE INVENTION

The present invention is an electromechanical cryocooler for cooling an instrument, such as a radiation detector, while achieving minimal vibration. The cryocooler contains a compressor having a linear motor and a piston and measuring means for measuring the direction of force of the vibrations of the compressor. The cooler also comprises a counterbalance and control means that are responsive to signals generated by the measuring means to move the counterbalance with a counterforce 180° out of phase with the vibrations to substantially reduce the vibrations.

The control means produce a sinusoidal drive signal to reduce the vibration on the fundamental frequency and several of its harmonics. The input of signals to the compressor and the counterbalance minimize the total acceleration of the cooler while performing its thermodynamic function. The control means are also used to regulate the cooler temperature. The cryocooler's diminished vibration makes practical the use of an active cooler to extract heat from portable field instruments, such as gamma ray detectors.

DETAILED DESCRIPTION OF THE INVENTION

Figure 1:
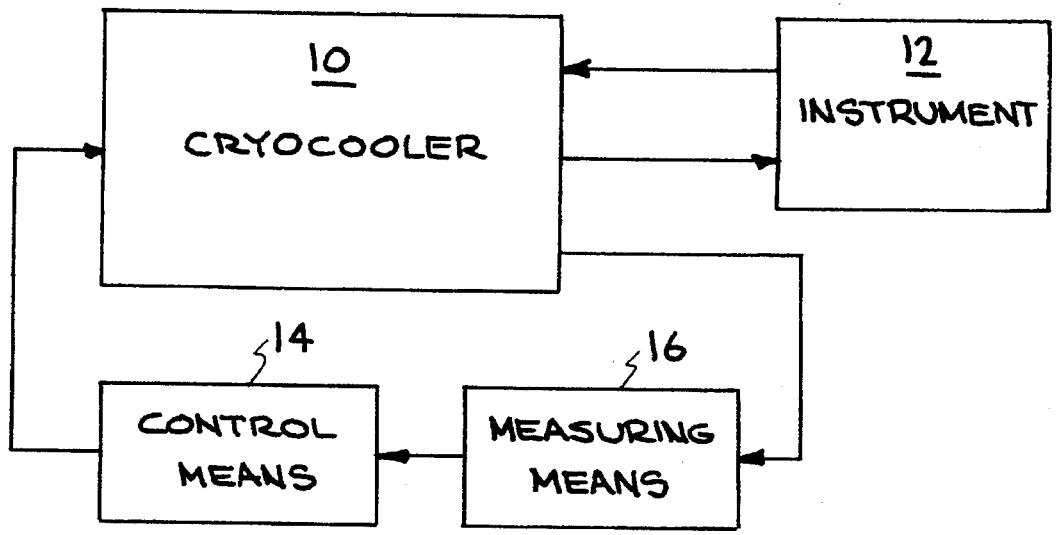
FIG. 1 is a schematic diagram of the cooler system.

The present invention is an electromechanical cryocooler that reduces or cancels out vibrations created by the cooler. FIG. 1 shows the basic cooler system components. The electromechanical cryocooler 10 extracts heat from an instrument 12 while under the control of a cancellation system comprising control means 14 and measuring means 16. The cancellation system does not use direct measurement from the instrument 12; rather the acceleration or movement of the cooler 10 is minimized. Since the instrument 12 is mounted to the cooler 10, the motion of the instrument 12 is also reduced.

Figure 2:
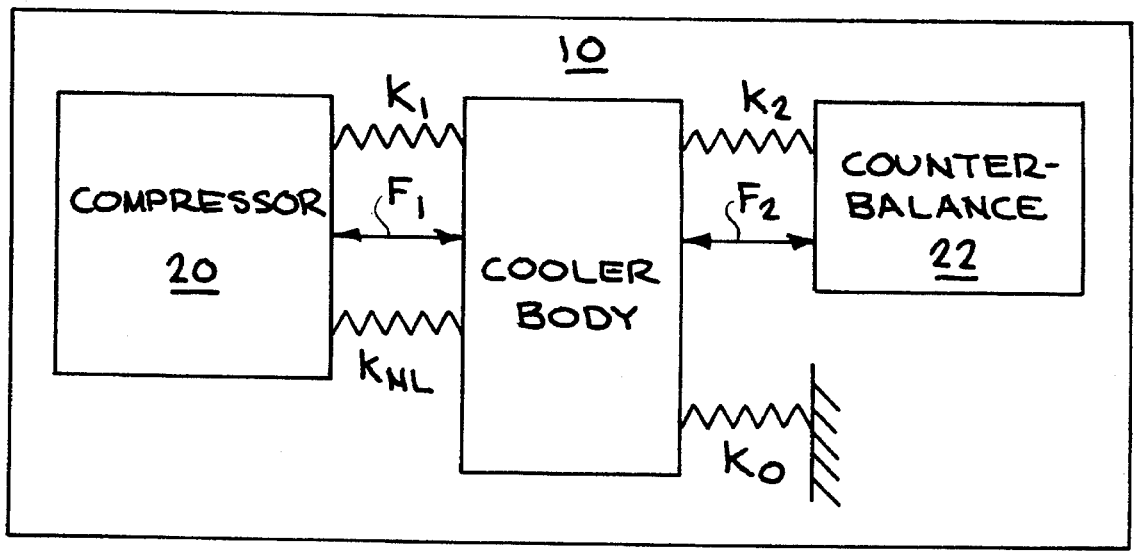
FIG. 2 is a simple mechanical model of the cooler system.

FIG. 2 shows a simple mechanical model of the cryocooler 10, which includes a compressor 20 containing a linear motor with a displacer piston (not shown) mounted thereon, and a counterbalance 22 mechanically coupled to the compressor 20. $K_0$ represents a soft spring that connects the cooler body 24 to ground. $K_1$ represents a linear spring for the compressor, and $K_2$ represents a linear spring for the counterbalance. A nonlinear spring ($K_{NL}$) represents the effect of gas dynamics. This nonlinearity is manifested when the gas is compressed and results in harmonics being introduced that generate vibration in the cooler.

Figure 3:
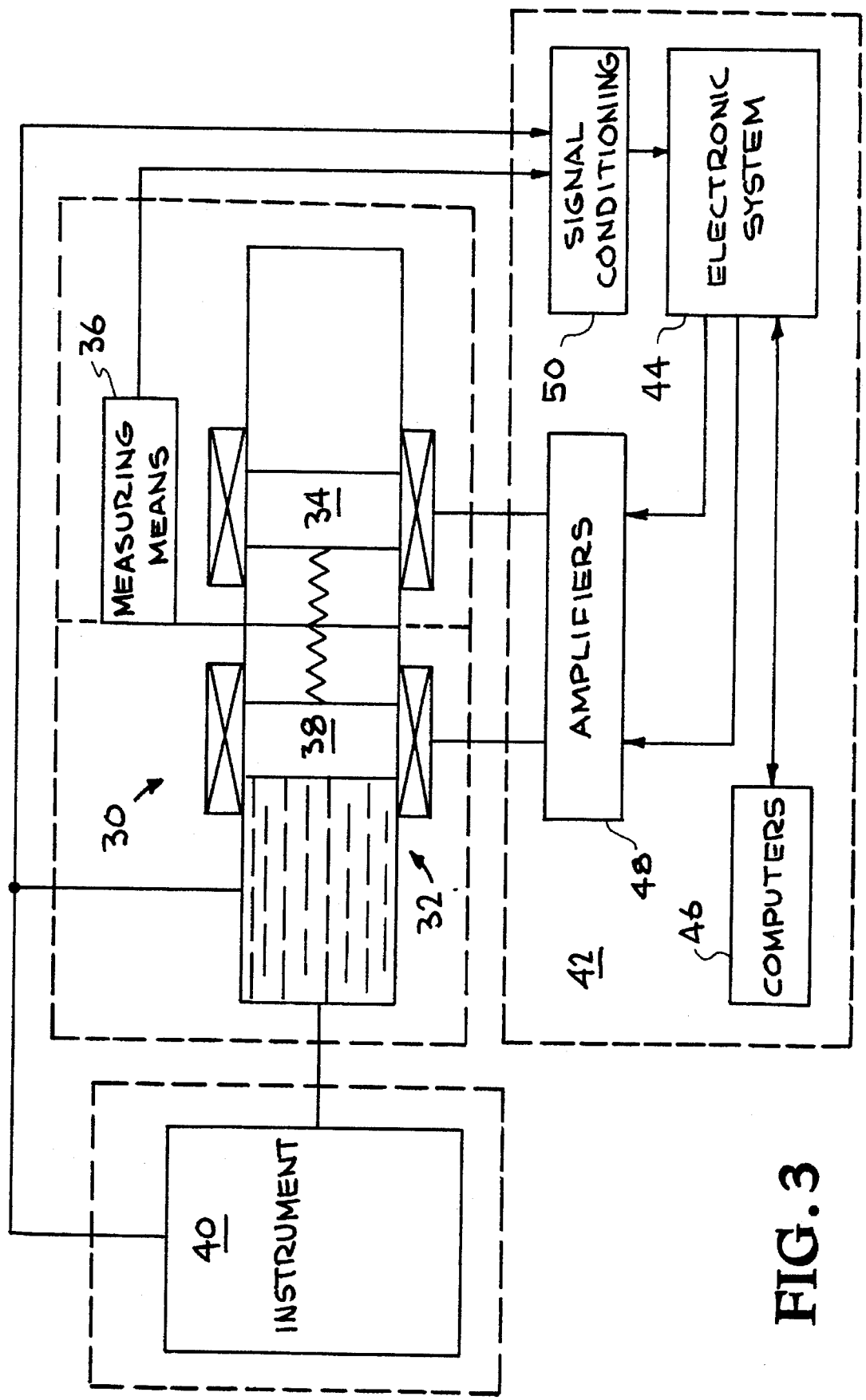
FIG. 3 is a diagram of the cooler in one embodiment of the invention.

FIG. 3 is a more detailed diagram of the cryocooler system. The system includes the cooler 30, which comprises a compressor 32 and a counterbalance 34. The compressor 32 and counterbalance 34 occupy antipodal parts of the same axis, and this positioning provides a substantial space interposed along the axis between the compressor 32 and counterbalance 34. The counterbalance 34 is preferably precisely aligned with the compressor 32 along the horizontal axis to provide the most accurate feedback to the measuring means 36. A slight misalignment can cause the measuring means 36 to generate misinformation about the counterbalance vibration and thereby produce a counterforce that is inconsistent with the magnitude of the vibration targeted for reduction. Misalignment along the y-and z-axes may be reduced by adding additional counterbalances along both of these axes.

The compressor 32 is preferably driven by a linear motor (not shown) with a moving compressor mass or piston 38 (driving piston). In addition, the compressor 32 is preferably operated at its mechanical resonance frequency to ensure maximum efficiency. The cooler 30 compresses and expands a working fluid, thereby generating vibration. The present invention uses an active feedback damper technology to substantially reduce the mechanical vibrations caused by the compressor 32 and a displacer piston (not shown) in the cooler. The displacer piston pushes compressed gas from the warm region where it was compressed into the cold region of the cooler where the compressed gas is expanded isothermally, doing work on the driving piston 38 and producing cooler temperatures.

The amount of force (vibrations) being applied by the compressor 32 to the instrument 40, and the frequency, magnitude, and phase angle of this force are all measured by the measuring means 36. A counterforce is calculated, using Fourier transforms, that is 180° out of phase with these vibrations ($F_1$ on FIG. 2). This counterforce ($F_2$ on FIG. 2) mitigates the degradation of energy resolution caused by vibration. For all higher harmonics, the phase is 180° lagged from the phase of the fundamental frequency. The counterforce is generated by the counterbalance 34 to substantially reduce the vibration of the instrument 40.

In a preferred embodiment, the measuring means 36 is connected to the casing of the counterbalance 34. The measuring means 36 may comprise or consist of a laser, a strain gauge, an accelerometer, a piezoelectric device, or any combination thereof. The output signal of the measuring means 36 is received and interpreted by control means 42 to control the counterbalance 34 stroke to produce a counterforce that substantially reduces the vibration. The generated counterforce comprises a force 180° out of phase to the phase angle of the vibration and equal to the measured magnitude of the vibration. The counterbalance 34 operating out of phase with the compressor 36 substantially reduces the force imbalance at the fundamental frequency and its first ten harmonics. The cooler operates at a preferred fundamental frequency of 58.65 Hz.

The cooler is driven by a sinusoidal wave from the control means 42. The sine wave reduces the contribution of harmonics of the drive frequency without significantly compromising thermodynamic efficiency, and reduces them to a greater extent than a square wave based on broad pulses that are kept on for long duty cycles. The presence of strong components of odd harmonics of the fundamental drive frequency of a broad-pulsed square wave directly introduces forces at those frequencies which result in undesirable motion at the instrument housing. Consequently, the use of a modulating voltage in which the pulse widths are narrow and frequencies are finely chopped up to produce a sine wave current is preferred. Accordingly, the frequencies with significant vibration will change less dramatically with the use of a sinusoidal input. The sine wave in the present invention is driven by at least one H-bridge driver with a pulse width modulator.

The control means 42 comprises an electronic system 44 that receives and interprets signals from the measuring means 36 to adjust movement of the counterbalance 34. The electronic system 44 inputs a sinusoidal drive signal to initiate compressor 32 and counterbalance 34 movement. The control means 42 is preferably a digital control system that also includes computers 46, amplifiers 48, signal conditioning electronics 50, and software for continuously checking the amount of vibration produced by the cooler while cooling an instrument 40. The electronic system 44 periodically calculates the vibration of the compressor 32 and may input signals to produce ramping up in power of the counterbalance 34 as the compressor 32 ramps up in power.

Signals from the control means 42 are generated by a least-means-square algorithm that contains the first ten tones of the vibration. Continuous updating of the weight value assigned to each harmonic and the fundamental frequency is performed to successfully dampen the vibration. For example, the control means 42 may use an MX31 Modular Embedded Systems from Integrated Motion Systems Company in Berkeley, Calif., and a TMS320C31 chip from Texas Instruments.

A temperature control loop may be incorporated as part of the cooler to minimize the cool-down period. To conserve energy while an instrument is being cooled, the cooler dissipates heat loads initially at higher temperatures and at an input power of approximately 27 watts. Once the instrument reaches operating temperature, the input power of the cooler is reduced. For example, dissipation of heat loads between 20 and 50 watts at higher temperatures of ambient air temperature, approximately 294K, is performed until the cooler reaches a desired temperature of 77K. At this point, input power can be reduced to about 30 watts to produce a reduction in heat load dissipation.

When the instrument is cooled down to its operating temperature, it does not always require the full cooling capacity of the mechanical cooler to maintain this desired operating temperature. The intentional decrease in power dissipation by selectively changing the temperature as soon as the instrument or cooler reaches operating temperature results in energy conservation. Consequently, the cool-down period for the instrument is minimized, further reducing the overall heat loads and power requirements of the cooler.

A second temperature control loop may control the rate at which the cooler starts up. For example, if the temperature is above 100K, the electronic system will ramp up slowly to the predetermined maximum power. Conversely, if the temperature is below 100K, indicating the cooler and instrument are already cold, the electronic system will accelerate very fast. This second temperature control loop uses standard mathematical equations to process the information received by the electronic system. The electromechanical cooler may also include a mechanism for shutting down the cooler to prevent any damage to individual components from mechanical or electrical defects.

The cooler of the present invention is useful for cooling a wide variety of instruments including a detector, a spectrometer, a gas chromatograph, or any other device which would benefit from being cooled by a cryogenic cooler. Moreover, the electromechanical cooler is substantially insensitive to axis orientation. Thus, if external vibration is applied to the combination of the cooler and an instrument, a substantial reduction of vibration from the external source will occur so long as the external vibration is within the dynamic range of the cooler.

Cryocooled Gamma-Ray Detector

The electromechanical cooler is integrated with a high resolution germanium based gamma-ray measuring instrument. A 500 mm$^2$ by 15 mm thick germanium detector is used. The energy resolution of the detector is 510 eV (full width at half maximum, FWHM) at 122 keV when cooled by liquid nitrogen. When cooled with the electromechanical cryocooler, the energy resolution of the detector is 540 eV at 122 keV. Approximately 2.5 hours are required to cool the detector to its operating temperature. Sixty-seven watts of power are required to reach operating temperature for the detector. When operating temperature is reached, only 30 watts of power are required. The cancellation system is designed to be powered by a 18–32 V battery, where up to ten harmonics of the 58.65 Hz drive frequency are controlled.

The foregoing description of preferred embodiments of the invention is presented for purposes of illustration and description and is not intended to be exhaustive or to limit the invention to the precise form disclosed. Many modifications and variations are possible in light of the above teaching.

I claim:

1. An electromechanical cooler for cooling an instrument while generating minimal vibration, comprising:

a compressor, wherein the compressor vibrates during operation of the cooler;

a counterbalance mechanically coupled to the compressor;

measuring means for measuring the direction of the external mechanical forces of vibrations of the compressor and generating a corresponding signal; and control means for interpreting the signal generated by the measuring means and generating a drive signal to move the counterbalance with counterforces 180° out of phase with the vibrations to reduce the vibrations at a fundamental frequency and associated harmonics.

2. The electromechanical cooler as recited in claim 1, wherein the compressor comprises a linear motor and a piston.

3. The electromechanical cooler as recited in claim 1, wherein the counterbalance and the compressor occupy antipodal parts of a single axis so that a space is interposed along the axis between the compressor and the counterbalance.

4. The electromechanical cooler as recited in claim 3, wherein the counterbalance and the compressor are aligned with each other along a horizontal axis.

5. The electromechanical cooler as recited in claim 1, wherein the measuring means is connected to the counterbalance.

6. The electromechanical cooler as recited in claim 1, wherein the control means comprises an electronic system that receives and interprets the signals from the measuring means and generates a sinusoidal drive signal to initiate compressor and counterbalance movement.

7. The electromechanical cooler as recited in claim 6, wherein the movement of the counterbalance produces ramping up in power of the counterbalance as the compressor ramps up in power.

8. The electromechanical cooler as recited in claim 6, wherein the electronic system periodically calculates the vibration of the compressor.

9. The electromechanical cooler as recited in claim 6, wherein the control means further comprises an H-bridge driver with pulse width modulation for inputting the sinusoidal drive signal.

10. The electromechanical cooler as recited in claim 1, wherein the measuring means is selected from the group consisting of lasers, strain gauges, accelerometers, and piezoelectric devices.

11. The electromechanical cooler as recited in claim 1, wherein the instrument is selected from the group consisting of a detector, a spectrometer, and a gas chromatograph.

12. The electromechanical cooler as recited in claim 1, wherein the cooler is substantially insensitive to axis orientation.

13. The electromechanical cooler as recited in claim 1, further comprising temperature control means for reducing input power after the instrument has reached a predetermined operating temperature.

14. The electromechanical cooler as recited in claim 1, further comprising safeguard means for shutting down the cooler to prevent any damage to individual components from mechanical or electrical defects.

15. An electromechanical cryocooler for cooling a gamma ray detector while generating minimal vibration, comprising:

a compressor, wherein the compressor vibrates during operation of the cooler;

a counterbalance mechanically coupled to the compressor;

measuring means for measuring the direction of the external mechanical forces of vibrations of the compressor and for generating a corresponding signal; and control means for receiving and interpreting the signal from the measuring means, and initiating movement of the counterbalance with counterforces 180° out of phase with the compressor's vibrational force to reduce the vibrations at a fundamental frequency and associated harmonics.

16. An electromechanical cooler for cooling an instrument while generating minimal vibration, comprising:

a compressor, wherein the compressor vibrates during operation of the cooler;

a counterbalance mechanically coupled to the compressor;

measuring means for measuring the direction of the external mechanical forces of vibrations of the compressor and generating a corresponding signal, wherein the measuring means measures frequency, magnitude, and phase angles of the vibrations; and control means for interpreting the signal generated by the measuring means and generating a drive signal to move the counterbalance with counterforces 180° out of phase with the phase angles of the vibrations to reduce the vibrations at a fundamental frequency and associated harmonics.

* * * * *